March 26, 1940.

J. E. REGAN 2,194,912

CONVEYER

Filed Sept. 25, 1937

Inventor,
John E. Regan,
by Roberts, Cushman & Woodberry.
Attys.

March 26, 1940.  J. E. REGAN  2,194,912
CONVEYER
Filed Sept. 25, 1937  9 Sheets-Sheet 5

Inventor,
John E. Regan
by Roberts, Cushman & Woodberry.
Attys.

March 26, 1940.  J. E. REGAN  2,194,912
CONVEYER
Filed Sept. 25, 1937   9 Sheets-Sheet 6

Inventor,
John E. Regan,
by Roberts, Cushman & Woodbury
Attys.

Patented Mar. 26, 1940

2,194,912

UNITED STATES PATENT OFFICE 2,194,912

CONVEYER

John E. Regan, Syracuse, N. Y., assignor to The Lamson Company, Syracuse, N. Y., a corporation of Massachusetts Application September 25, 1937, Serial No. 165,719

17 Claims. (Cl. 214—11)

This invention relates to an improvement in conveyers and more particularly to means for controlling the loading and unloading of conveyer cars.

One object of this invention is to provide means under control of an operator whereby loads placed upon a car are delivered by that car at a predetermined unloading station; such means comprising a plurality of tabs at a despatching station and a plurality of dogs on the car, certain such tabs being set by the operator to trip certain of the dogs on the car and the tripped dogs upon the arrival of the car at the selected unloading station, actuating the unloading mechanism at that station to remove the load from the car.

Another object of this invention is the provision at each loading station of a tab set automatically upon the operation of the loading mechanism thereat to trip a dog on the car and thereby designate such car as one carrying a load and at each unloading station a tab automatically set, upon the arrival of a car carrying a load destined for that station, to restore the tripped dog on the car to its normal condition whereby the car is no longer designated as one carrying a load.

Other objects of this invention relate to the structure and operation of the tab mechanism at the station, the structure and operation of the loading and unloading mechanism associated with the conveyer and other details and interrelation as may be hereinafter set forth.

These objects will appear from a consideration of the following description and of the accompanying drawings which form a part thereof and in which.

For the purpose of illustrating the invention I have selected a conveyer system comprising a conveyer of the overhead type, the cars of which are adapted to transport loads, a plurality of loading stations, each including an elevator by which loads are fed to the cars and a selective device by which the destinations of the loads fed to the cars are predetermined and a plurality of unloading stations each including an elevator by which the loads are removed from the car. It will be understood, however, that I am not limited thereto since the invention may be used in systems of other types.

Figure 1:
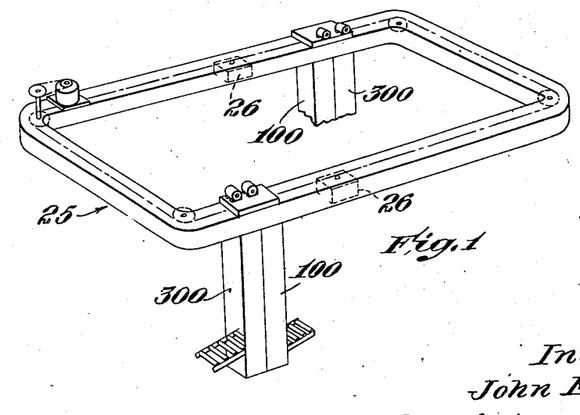
Fig. 1 is a schematic perspective view illustrating a conveyer system wherein this invention is embodied.

The selected system, as shown in Fig. 1, comprises a conveyer 25 of the overhead type including a plurality of cars 26, a plurality of loading stations 100, and a plurality of unloading stations 300. The loads are placed upon the cars 26 at the loading stations 100 and are delivered at the desired unloading stations 300 through the action of selector tabs 161 set by the loading operator upon dogs 55 carried by the cars.

The cars 26 are supported and continuously advanced by a chain 27 suitably supported and driven by suitable power means and guided by pairs of tracks 28 and 29. Supported by the tracks 28 are plates 30 which serve to steady the cars particularly at the turns. Plates 31 secured to the undersides of the tracks 29 close the openings below the cars except at the loading and unloading stations. Openings 32 are provided in the plates 31 in advance of each station for a purpose which will be described below.

Figures 2, 4:
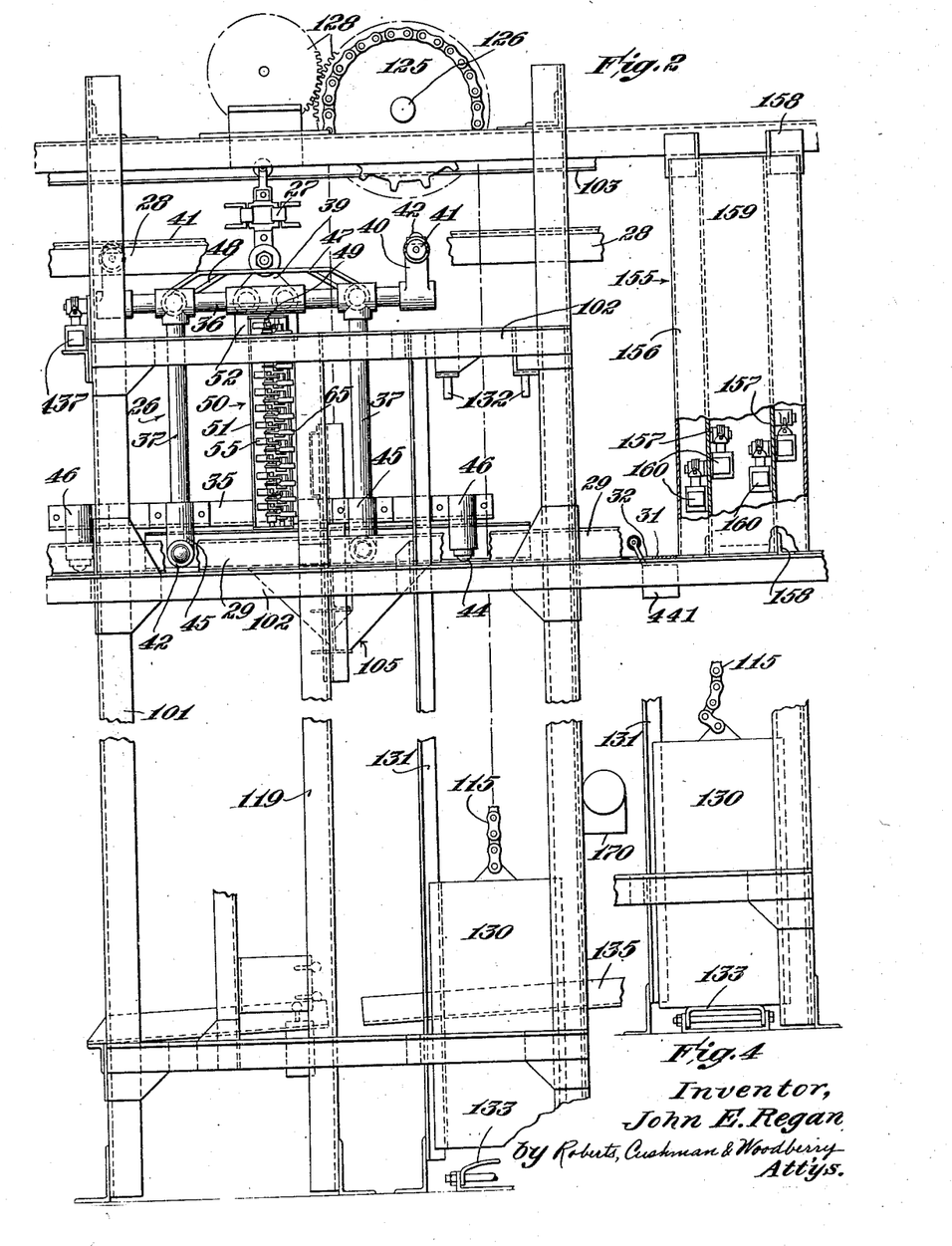
Fig. 2 is a view in part elevation of a typical loading station of that system.
Fig. 4 is a view of an element of such station in a position other than that shown in Fig. 2.
Figure 3:
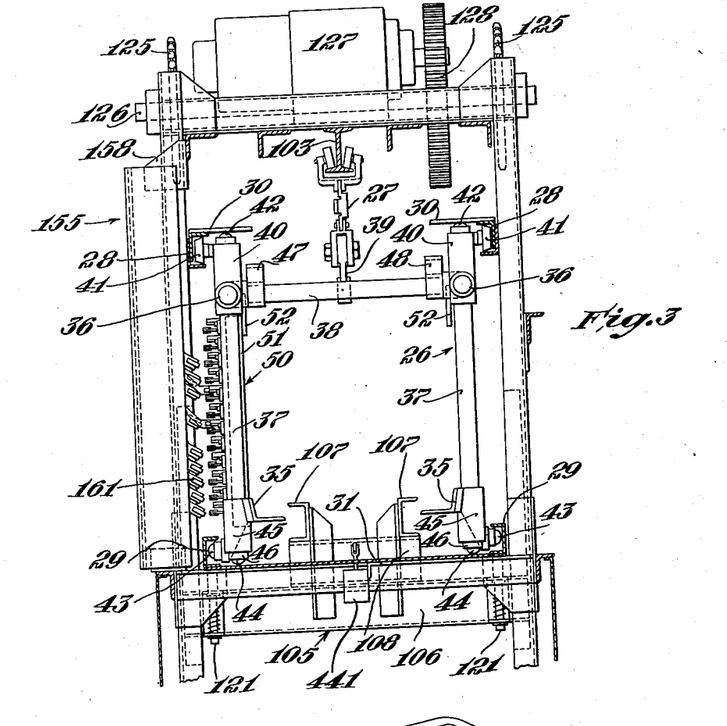
Fig. 3 is a side elevation view of the upper portion of such station.

Each car 26 (see Figs. 2 and 3) comprises a pair of flanged bars 35 extending along each side at the bottom, a pair of tubes 36 at the top and parallel to the bars 35, posts 37 connecting said bars and tubes and brace rods 38, four in number, connecting the tubes 36. Carried by the two inner rods 38 is a plate 39 by which the car is attached to the chain 27. Mounted at each end of each tube 36 is a post 40 carrying a roller 41. The rollers 41 ride in the tracks 28 and act with casters 42, 43 and 44 to steady the car and, when occasions arise, to prevent undue tipping thereof. The casters 42 are carried by the posts 40. The casters 43 are carried by brackets 45 secured to the bars 35 at the base of the posts 37. The casters 44 are carried by posts 46 secured to the bars 35 adjacent each end thereof. The rollers and casters serve to steady the cars and hold them against undue tipping. Should such condition arise the rollers 41 will ride against the flanges of the tracks 28, the casters 42 will ride against the plates 30, the casters 43 against the tracks 29 and the casters 44 against the plate 31. At the top of each car are provided cam bars 47 and 48 supported at their ends upon the two outer rods 38. The loads rest at their ends upon the flanged bars 35 for transportation by the cars.

Mounted at one side of the car 26 substantially midway thereof is one element 50 of the destination selective device. This element comprises a U-shaped housing 51 open at the outer side and secured at the bottom to a bar 35 and at the top to a plate 52 carried by a tube 36. A similar plate 52 is secured to the other tube 36 so that a duplicate of the element 50 might be there mounted if desired. A pair of rods 53 and 54 carried by the top and bottom walls of the housing extend longitudinally therethrough, the rod 53 carrying a plurality of dogs 55 having bushings and movable independently about the rod. Each dog 55 is a plate irregular in formation having concave depressions 56 and 57 in its opposite ends. The depression 56 is reinforced by a flange 58 which extends over the edge 59, connecting the depressions. Each dog is normally held by a spring 60 in the position shown in Fig. 10 with the wall 61 of the depression 56 projecting from the housing. A boss 62 on the dog surrounds the rod 53 and from it projects a pawl 63 and a flanged limit stop 64. The dogs are preferably though not necessarily integral in construction as here shown. Carried by the rod 54 are a plurality of independently movable latches 65 one for each dog. Each latch 65 is J-shaped and comprises a finger 66 stiffened at its outer end by a flange 67, a boss 68 which surrounds the rod 54 and an arm 69 terminating at its outer end in a head 70. A spring holds the head 70 at all times in contact with the boss 62 of the dog.

Figures 8, 9, 10, 11:
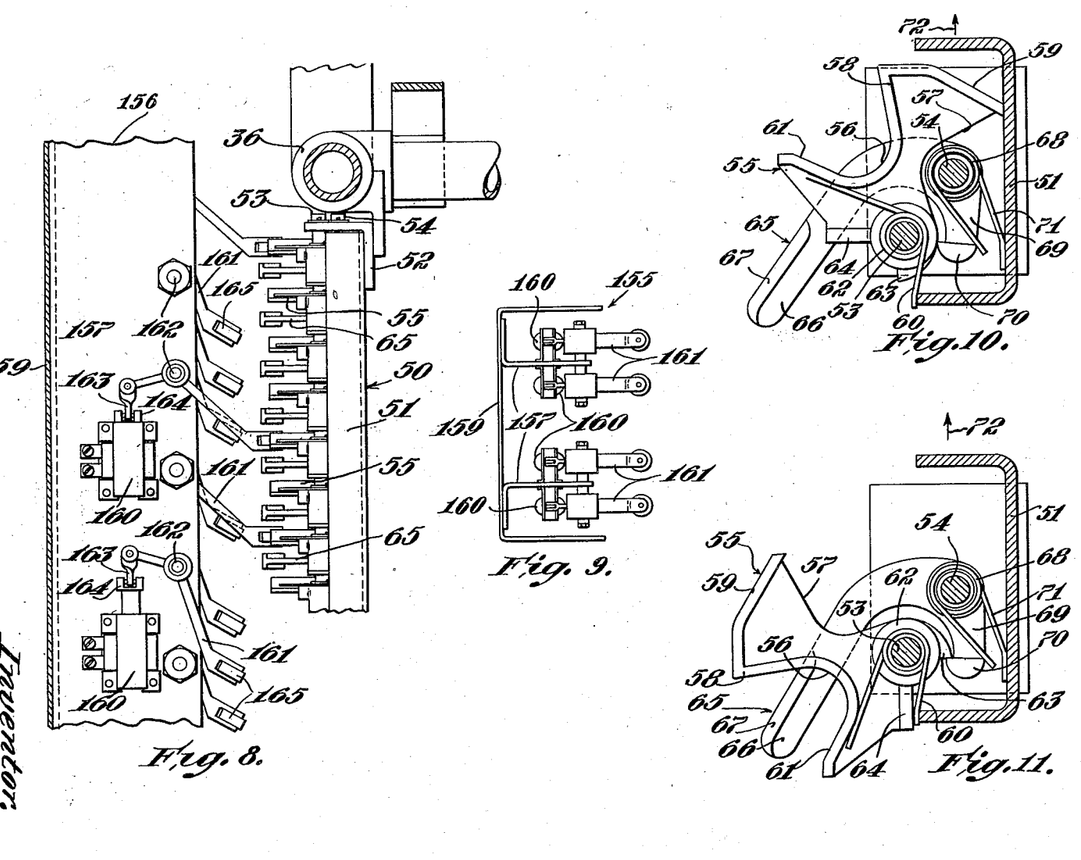
Fig. 8 is an end elevation on an enlarged scale of one of the selective device elements at each loading station and of the selective device element on each conveyer car.
Fig. 9 is a plan view of such station selective device element.
Figs. 10 and 11 are sectional plan views of the car selective device element illustrating two positions taken by movable parts thereof.

When, as the car is traveling in the direction indicated by the arrows 72 on Figs. 10 and 11, the wall 61 of a dog 55 in its normal position is brought by the travel of the car into contact with a stationary element, it is tripped and swings into the position shown in Fig. 11 with the limit stop 64 in contact with one side wall of the housing 51 and the edge 59 of the dog projecting. The dog is held in this position by the head 70 of the latch 65 which engages the pawl 63 and remains in that position until the finger 66 is tripped, as the car continues its travel, whereupon the dog 55 is restored by its spring 60 to normal position.

Each loading station 100 comprises a frame which defines an elevator shaft, an elevator carriage which is reciprocated in the shaft by suitable power means, a load-feeding platform by which loads are placed upon the elevator carriage and a selective device by which the destinations of the loads delivered to the cars are determined.

The station frame which comprises a suitable number of uprights 101 and cross beams 102, supports the conveyer car tracks 28 and 29 and the track 103 from which the conveyer chain 27 is suspended, and by which the chain is guided.

Figure 5:
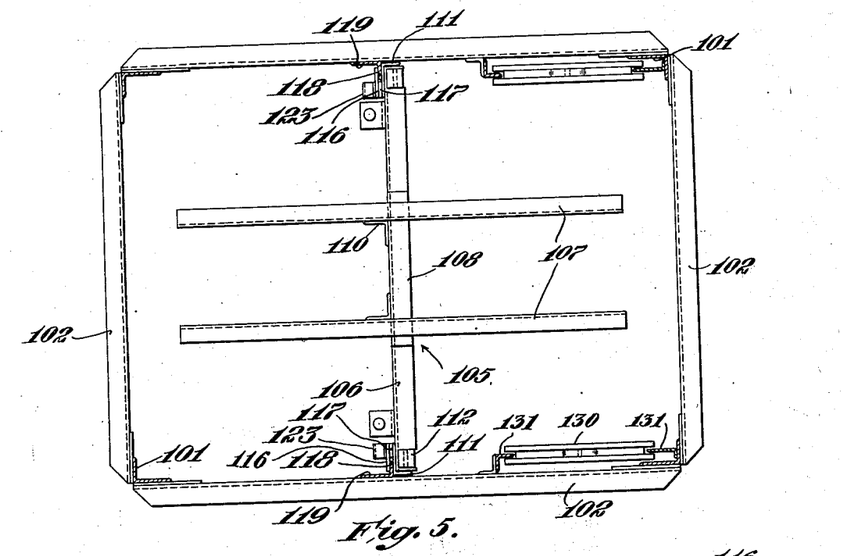
Fig. 5 is a plan view of the elevator carriage illustrating its relation to the walls of the elevator well.
Figures 6, 7:
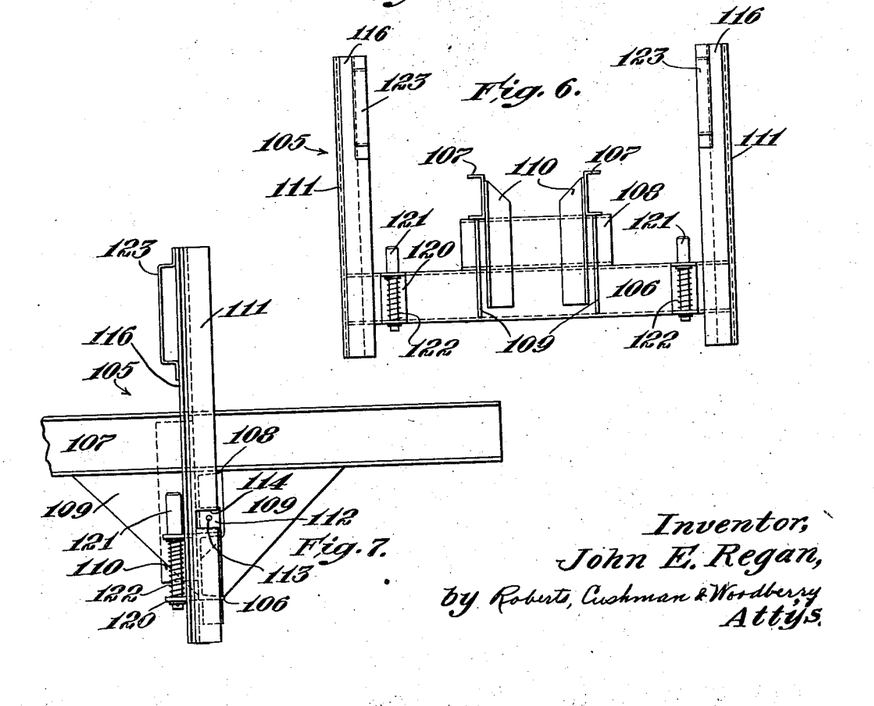
Fig. 6 is an end elevational view of the carriage.
Fig. 7 is a side elevation thereof, a portion being broken away.

The elevator carriage 105 (see Figs. 5, 6 and 7) comprises a transverse beam 106, a platform consisting of two spaced, longitudinal beams 107 supported upon a second transverse beam 108 carried by the beam 106 and fixed in position by braces 109 and angle bars 110 and vertical angle beams 111 secured to the ends of the beam 106. Fixed in a notch in the beam 106 at each end thereof and within the angle of the vertical beams 111 is a block 112 having an opening 113 at the upper end thereof accessible from outside the carriage through notches 114 in the beams 111. The ends of the elevator chains 115 are secured to the carriage 105 by the blocks 112 and lie in the angles of the beams 111. Secured to each beam 111 is a bar 116 spaced from the beam 111 by a filler 117 to provide outside pockets 118. The pockets 118 receive angle beams 119 secured to the crossbeams 102 of the frame and thus the vertical travel of the carriage is guided. Secured to beam 106 near the beams 111 are U-shaped brackets 120 carrying pins 121 and springs 122 which normally hold the pins in a raised position. Fixed to the bars 116 near the top thereof are cam plates 123.

The chains 115 pass over the sprockets 125 on a shaft 126 suitably supported at the top of the frame and driven by a motor 127 through gearing 128. The other ends of the chains 115 are attached to counterweights 130 guided in their vertical travel in shafts by angles 131 fixed to the elevator frame. At the top and bottom of the counterweight shafts are spring bumpers 132 and 133. The bumpers 133 are so set that when fully depressed by the counterweights 130 (see Fig. 4) the chain 115 is slackened. This allows the force of gravity to act directly on the carriage and exert a braking effect which opposes the normal tendency of the carriage to float or coast so that the carriage stops almost immediately when it reaches the top of the well.

Figure 16:
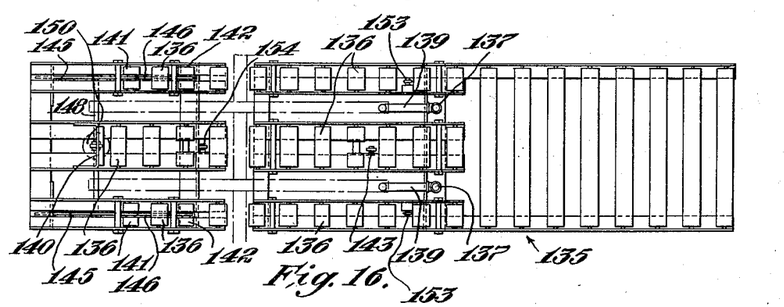
Fig. 16 is a plan view of the load-feeding platform at each loading station.
Figures 17, 19:
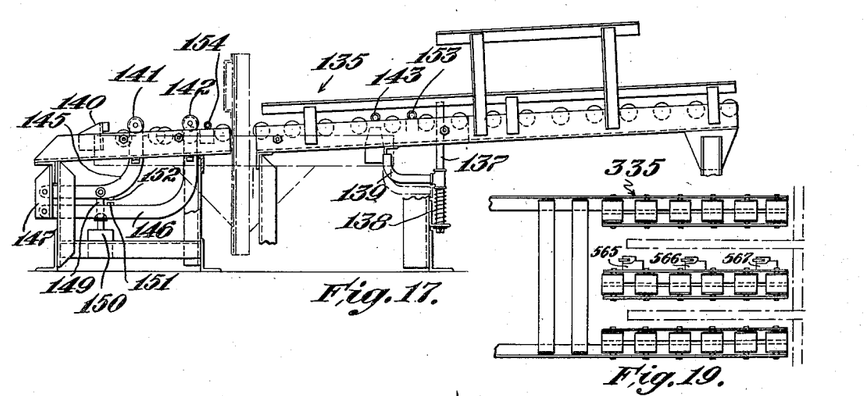
Fig. 17 is a side elevational view thereof.
Fig. 19 is a plan view of a portion of the load-removing platform at each unloading station.
Figure 18:
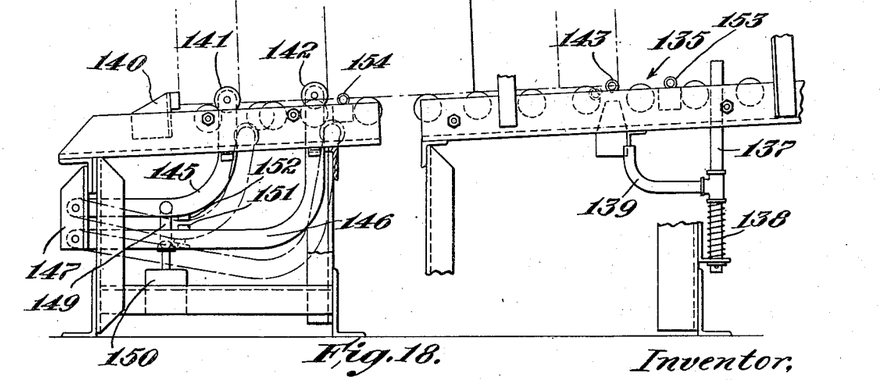
Fig. 18 is an enlarged side elevational view of a portion of such platform illustrating its use with loads of various sizes.

The loads are fed to the carriage by an inclined platform 135 (see Figs. 16, 17 and 18) consisting of a gravity roller conveyer. The platform within the elevator well is divided into sections spaced apart to permit the passage of the beams 106 and 107 of the elevator carriage therebetween, each section comprising a plurality of idler rollers 136. Stop pins 137 carried by the elevator frame project out into the spaces between the outer sections at the entrance to the well and control the entry of loads to the well. The pins 137 are normally held in the raised operative position by springs 138. Carried by each pin 137 is an arm 139 which projects into the path of the carriage. The pins 137 are depressed to admit a load when the carriage has descended by the contact of the beams 107 with the arms 139 (see Fig. 17).

In order that loads of various sizes be properly located on the elevator carriage it is necessary to provide means by which the loads will be positioned in the well over the beams 107 with regard to their length. Such means are here shown as comprising a fixed stop 140 and rollers 141 and 142 arranged between the stop 140 and the center of the elevator well and released when the loads are entirely within the well. The rollers are actuated by electrical means controlled by a switch 143 tripped by the leading end of each load, shortly after it has entered the well. Each roller 141 is mounted upon one end of an arm 145 and each roller 142 is mounted upon one end of an arm 146. The arms 145 and 146 are each pivoted at the other end upon brackets 147 and are yieldably held by spring means (not shown) in the full line position indicated in Fig. 18 with the rollers 141 and 142 normally in the path of travel of the loads. The arms 145 are connected by a crossbar 148 secured at the middle to the plunger 149 of a solenoid 150. The arms 146 are in the vertical planes of the arms 145 and carry ears 151 positioned to contact ears 152 on the arms 145.

The switch 143 and solenoid 150 are elements of an electric circuit (not shown) which is normally open. The switch 143 is of the circuit maker type and when tripped by a load the circuit is closed and the solenoid energized lowering the arms 145 to depress the rollers 141. As the arms 145 are lowered the ears 152 thereon contact with the ears 151 on the arms 146 so that the latter arms are also lowered and the rollers 142 depressed. As soon as the load passes the switch 143 is released and the circuit is broken, deenergizing the solenoid 150 and releasing the arms 145 and 146 whereupon the rollers 141 and 142 are returned to their normal positions by the yieldable means. The travel of the load is thereupon checked by the rollers 142, or 141 or the stop 140 depending upon its position when the switch was released. Obviously if the load was over the rollers 141 and 142, such rollers would be prevented from rising into its path until the load had been removed by the carriage, if over the rollers 142, the rollers 141 would rise and check its further travel, and if it had not reached the rollers 142 they would act to stop the load. The positions taken by the loads are suggested on Fig. 18, the shortest load being indicated by full lines, the longest load by dash and two dot lines, and the intermediate load by dash and dot lines.

As the load passes over the platform of the carriage it closes a switch 154 and holds it closed until the carriage starts its upward travel. This switch prevents the raising of the carriage when empty or if the load is not placed properly thereon. In place of the single switch shown in Fig. 16, indicated in the wiring diagram on Fig. 22, two or more switches may be provided.

The elevator carriage 105 is caused to rise and deliver its load to a car 26 by the motor 127 actuated by electrically controlled instrumentalities as will be set forth herebelow. The destinations of the loads are determined by a selective device controlled by the operator. One element 50 of that device is mounted upon each car 26 and has been described in detail. Another element 155 of the device includes a housing 156 supported upon the frame of the overhead conveyer 25 in advance of the loading station.

The housing 156 (see Figs. 2, 3, 8 and 9) comprises a pair of spaced vertical angle posts 157 secured at top and bottom to the conveyer frame by brackets 158, is closed at the outer side by a cover plate 159 and is open at the inner side. Mounted upon each face of each post 157 are a plurality of vertically spaced solenoids 160. A plurality of tabs 161 are pivoted at 162 to the posts, each tab being connected at one end by a link 163 to the plunger 164 of a solenoid 160. The other end of each tab carries a roller 165 and projects through the open side of the housing. As shown in Fig. 8 the tabs 161 are normally, i. e., when the solenoids are deenergized, out of the path of travel of the cars but when actuated by the solenoids the tabs are swung so that the rollers 165 will trip dogs 55 of the elements 50 on the cars. In the illustrated embodiment the car element 50 is shown provided with twelve dogs 55 and the element 155 is provided with eleven tabs 161. The tabs 161 are so positioned that when set they will trip all except the top dog which, as will be described later, indicates whether the car is loaded or empty.

Figure 12:
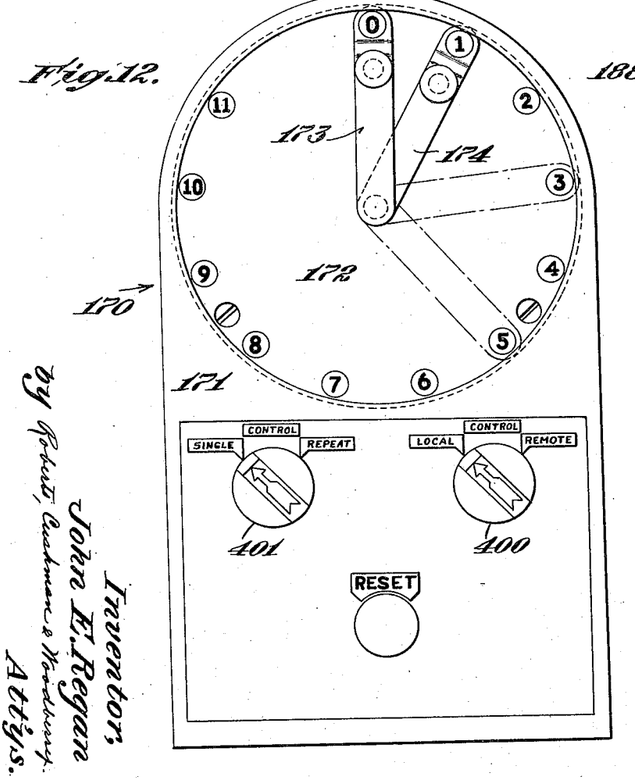
Fig. 12 is a front elevational view of another selective device element at each loading station.
Figure 13:
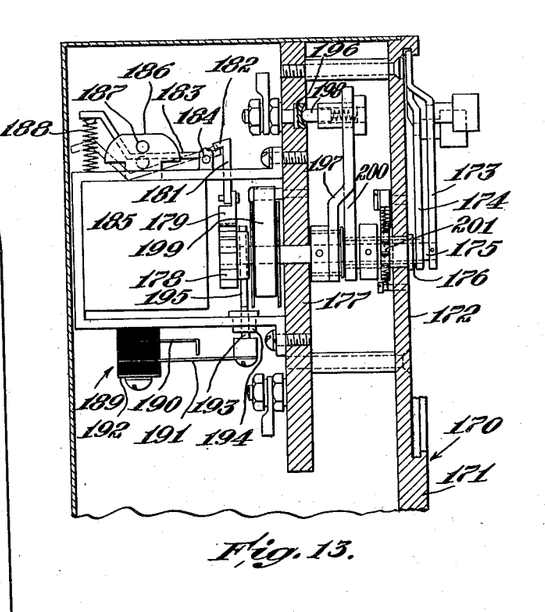
Fig. 13 is a cross-sectional view of the upper portion of such element.
Figure 14:
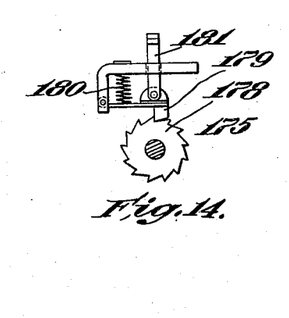
Figs. 14 and 15 are sectional views of two details of that element.

The energizing of the solenoids 160 to set the tabs 161 is controlled by the operator at the station through an element 170, mounted at each loading station in any position convenient for the operator. As here shown, it is mounted upon the elevator frame above the feeding platform. The element 170 (see Figs. 12 and 13) comprises a housing 171, provided with dial 172 over which may be moved arms 173, 174. Projecting through the housing at the center of the dials are the ends of a shaft 175 and a sleeve 176 which encloses the shaft, and the inner ends of the arms 173, 174 are secured to the shaft 175 and sleeve 176 respectively. The shaft 175 extends through a wall 177 parallel to the dial 172 and upon its inner end is secured a ratchet 178. A suitably supported latch 179 is held by a spring 180 in contact with the periphery of the ratchet 178 to prevent its rotation in one direction, clockwise in Fig. 14. Pivoted at one end to the latch 179 is a bar 181 its upper end 182 being bent at an acute angle. The bar is suspended by its angle from one end of a lever 183 fulcrumed at 184. The lever extends above a solenoid 185, the plunger 186 of which is provided with a pin 187. The pin 187 extends over the lever 183 and a spring 188 normally holds the lever in contact with the pin. Mounted below the solenoid 185 is a switch 189 comprising two spring plates 190 and 191 carried at their inner ends by a support 192 of suitable dielectric material. The outer end of the plate 191 is connected to the lower end of a plunger 193 reciprocable in a bushing 194. The upper end of the plunger projects above the bushing. Carried by the shaft 175 is a pin 195 which, when the arm 173 is in the full line position shown in Fig. 12, depresses the plunger and separates the plates. Obviously the rotation of the shaft to move the arm 173 out of this position causes the pin 195 to release the plunger, whereupon the plate 191 raises the plunger and, contacting with the plate 190, closes the switch 189.

In the face of the wall 177, nearest the dial 172 are embedded a plurality of contact posts 196 arranged in a circle and spaced apart so that the contact parts have a definite relation to the numbers on the dial. Fixed to the shaft 175 is an arm 197 which carries a contact pin 198 adapted as the shaft is rotated to register successively with the contact posts 196. A coil spring 199 is so secured to the shaft 175 that it is tightened as the shaft is rotated in the direction permitted by the latch 179.

Figure 15:
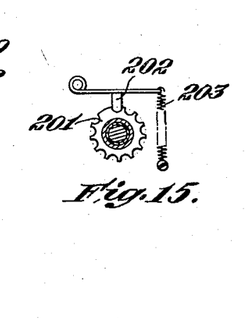

Mounted upon the sleeve 176 is an arm 200 which like the arm 197 is provided with a contact pin (not shown) adapted to register successively with the contact posts 196. A ratchet 201 carried by the sleeve and a pawl 202 held yieldably in mesh therewith by a spring 203 determines the positions which the sleeve will take. The ratchet and pawl are so formed that the sleeve can be rotated freely in either direction (see Fig. 15). It will be noted that the arms 173 and 174 are so positioned that the arm 174 must at all times lead. Moreover as will be pointed out below, in the description of the operation of this device, the arms 173 and 174 not only control the condition of the solenoids 160 and insure that two solenoids must be energized at the same time, but also upon the delivery of a load to a car, the arm 173 is returned automatically to the upright position shown in Fig. 12, the arm 174 however remaining as set until manually shifted.

Figure 21:
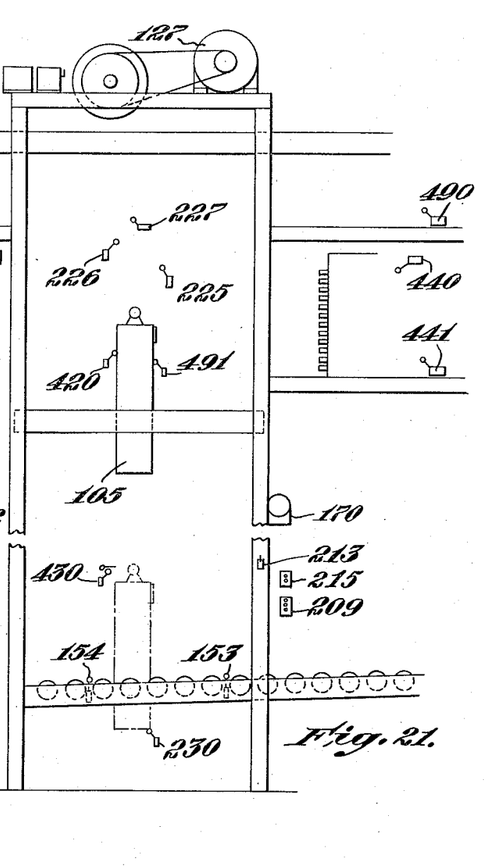
Fig. 21 is a schematic view illustrating the electrical details of each loading station.

Each loading station (see Fig. 21) is provided with a panel 209 equipped with three switches arranged for manual operation, a start-stop switch 210, an up switch 211 and a down switch 212, a lintel switch 213 which is tripped by contact with an improperly placed load to stop the elevator and a switch 215 by which the operator can start or stop the motor of the overhead conveyor 25.

The unloading stations 300 are generally similar in structure to the loading stations and the elements thereof are identical with the corresponding elements of the loading stations, except the unloading platform and the electrical control features. Such elements therefore will not be described in detail and where shown on the drawings will be designated by numerals which correspond to the numerals applied to such elements of the loading stations, for example the carriage 305, the motor 327, and the platform 335.

Loads removed from the cars 26 are delivered to a platform 335 the portion of which within the elevator well being divided, as is the platform 135 of the loading stations, into sections spaced apart to permit the beams of the elevator carriage to pass down between the sections and thus deliver the loads to the platform. The platform 335, like the platform 135 is inclined and comprises a gravity roller conveyor by which the loads leave the well. The upward movement of the carriage 305 after delivering a load must obviously be delayed until the load has left the well and this is insured by the provision of switches 565, 566 and 567. The load on the platform trips and opens one or more of the switches and as will be pointed out later the carriage can not be elevated as long as any of the switches is open.

Each unloading stations is provided with a panel 350 provided with three manually operable switches, to wit a start-stop switch 351, an up switch 352 and a down switch 353, and a switch 355 by which the motor of the conveyor 25 can be started or stopped.

The operation of the illustrated conveyor system embodying this invention will now be described with reference to the placing of a load upon a car 26 of the continuously traveling conveyor 25 at a typical loading station 100 and the delivery of that load at a typical unloading station 300 to which the load was despatched by the operator.

The operator first sets the tabs 161 of the element 155 through the element 170 so that they will trip those dogs 55 of the car to be loaded which insure the delivery of the load at the selected unloading station. This operation will be explained with reference to the diagram on Fig. 20. In that diagram are indicated not only the wiring for the elements 155 and 170 at the station but also the wiring for another element similar to the element 170 which may be located at other points as for example on a despatch board. The element 170 at the station will be referred to as the local element and the other element as the remote element. By the dial 400 the local or remote element is selected. The dial 401 is set according to whether a single load or a plurality of loads are to be despatched to the same unloading station. The solenoids 160 of element 155 are connected to the corresponding contact posts 196 by leads 405 and are connected to a common return lead 406 by leads 407. The contact pins 198 are connected by a lead 408 to the local post of the dial 400. The current enters the element 155 through a trunk lead 410 and leaves through a trunk lead 411.

Figure 20:
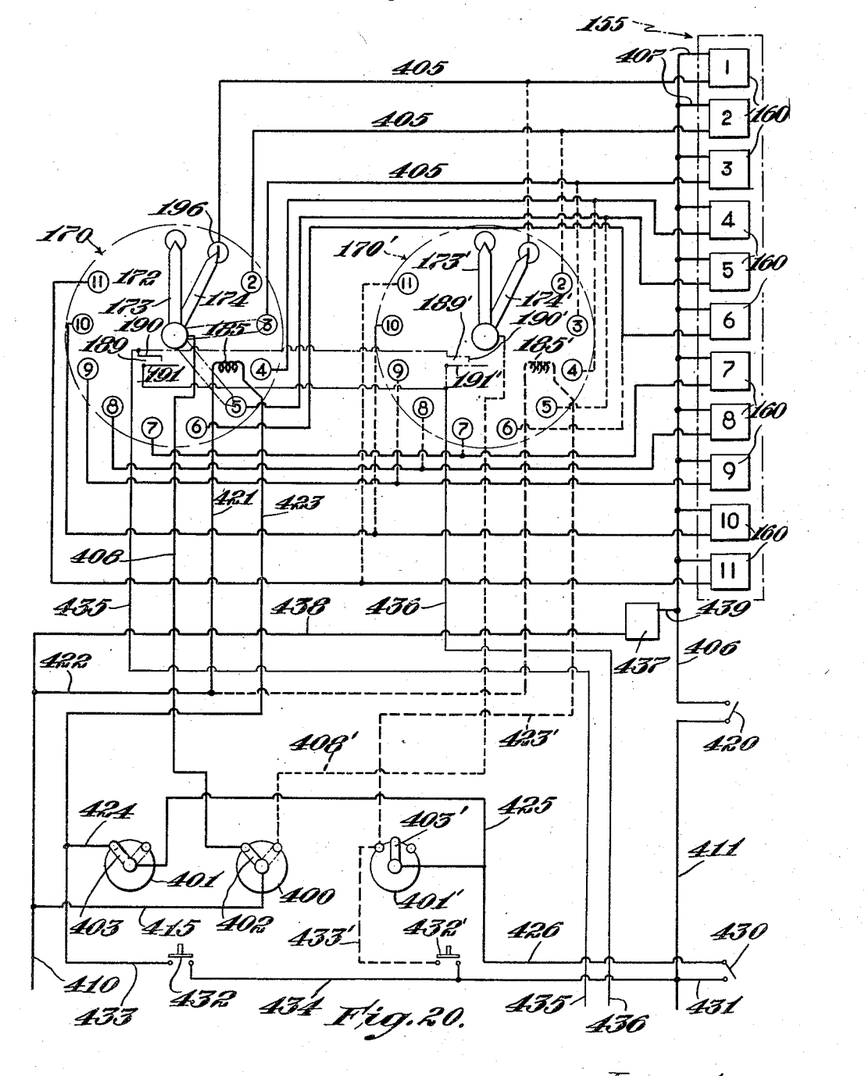
Fig. 20 is a wiring diagram of the selective device elements at each loading station.

Assuming that a single load is to be sent to that station and that the control is to be exercised by the local element, the finger 402 of the dial 400 and the finger 403 of the dial 401 are set as shown in full lines on Fig. 20. The arms 173 and 174 are then moved over the dial to positions at which they are held by the latch 179 and pawl 202, respectively. As shown in dotted lines on Figs. 12 and 20, the arm 173 is at position 3 and the arm 174 is at position 5. Thus is set up a circuit from the trunk lead 410 through lead 415, dial 400, lead 408, contact pins 198, contact posts 196, leads 405, solenoids 160 (numbered 3 and 5) leads 407, 406, and switch 420 to trunk lead 411. This circuit is normally open by the switch 420 and is completed when the switch is closed so that the selected solenoids 160 are energized. The solenoid 185 is connected to the trunk lead 410 through leads 421, 422 and to the trunk lead 411 through leads 423, 424, dial 401, leads 425, 426, switch 430 and lead 431. The switch 430 is, like the switch 420 normally open, and this circuit is completed when the switch is closed to energize the solenoid.

Both switches 420 and 430 are closed by the elevator carriage 105, the former during its upward travel and the latter during its downward travel. Hence only when the carriage is on its upward travel with a load are the tabs 161 set and only after the carriage has delivered its load and is descending is the solenoid 185 energized to raise the latch 179 and permit the arm 173 to return to its normal position. If, however, more than one load is to be sent to the same unloading station the finger 403 of the dial 401 is shifted to the dotted line position thereby breaking the circuit and preventing the energizing of the solenoid 185 by the closure of the switch 430 as the carriage descends. A reset switch 432 is provided, by which the solenoid 185 can be energized as desired at any time. The closure of the switch 432 by-passes the switch 430 by connecting the lead 423 directly with the trunk lead 411 through leads 433, switch 432 and lead 434.

If the tabs 161 are to be set at the remote element the finger 402 of the dial 400 is shifted to the dotted line position. The remote element is actuated in the same manner as the local element 170 and need not be described in detail. The parts of the remote element are indicated by the primes of the corresponding parts of the local element 170.

As stated above, the operation of the selective device is controlled by the carriage 105 as it travels in the elevator well. However, the carriage can not be operated unless the selective device has been previously set. This interlocking is attained through the switch 189 the plates 190 and 191 of which are only in contact when, as previously pointed out, the arm 173 has been shifted from its normal inoperative position. The closure of the switch 189 connects the leads 435 and 436 which play an essential part in the operation of the elevator motor 127. The automatic return of the arm 173 to its normal position of rest and the consequent opening of the switch 189 is of advantage since it removes the possibility of inadvertent operation of the elevator motor 127 and the inadvertent despatching of a load to the moving unloading station. That the arm 174 remains in any position until moved manually is not so objectionable since it plays no part in the operation of the elevator motor.

Referring to the diagram on Fig. 22 and assuming that the switch 210 at panel 209 is set to the start position, that the switches 153 and 154 are closed, the latter by a properly placed load, and that the element 170 has been set to close the switch 189 and connect the leads 435 and 436, the electrical controls for the operation of the carriage will be described.

The motor 127 is reversible and supplied with power from a trunk line comprising leads 450, 451 and 452, through a switch 445 when the carriage is raised or a switch 475 when the carriage is lowered. The switches 445 and 475 are controlled by magnetic starters which include relays 446 and 476 respectively. When one of these relays is energized the switch controlled thereby is thrown in and the motor 127 moves the carriage in the desired direction.

As an empty car 26 approaches the loading station the top dog 55 thereon which has been set to designate that the car is empty trips and closes a normally open switch 440 whereupon circuits, which start the motor 127 and cause it to raise the elevator carriage 105 with its load thereon, are completed. The relay 446 is energized to throw the up switch 445 by the following circuit traced from the trunk lead 450, branch lead 455, lead 456, switch 210, lead 457, lintel switch 213, leads 458, 459, switch 440 closed by dog 55, normally closed switch 441, lead 460, switch 153, lead 461, switch 154, leads 462, 463, relay 446, lead 464, normally closed switch 225, lead 436, switch 189 at selective element 170, leads 435, 465, 466 and 467 to trunk lead 451. Since the switch 440 is closed only for a short time (as long as the traveling dog is in contact therewith) a holding circuit is established which by-passes the switch 440 and continues the energizing of the relay 446 which is necessary to keep the up switch 445 closed. Such circuit is completed by the bar 469 on the switch 445 and consists of trunk lead 450, branch lead 455, lead 456, switch 210, lead 457, switch 213, leads 458, 468, switch bar 469, leads 470, 463, relay 446, lead 464, switch 225, lead 436, switch 189, leads 435, 465, 466, 467 and trunk lead 451.

The elevator carriage 105 is thereupon raised in the well to such a position that the load thereof is above the bars 35 of the empty car 26, which tripped the switch 440 whereupon it trips and opens switch 225 breaking the holding circuit just described so that the relay 446 is deenergized and the switch 445 is thrown out and the motor 127 stopped. The carriage has crossed the path of travel of the car, remains stationary until the car has brought the bars 35 directly below the load and then descends to transfer the load to the car. On its ascent the carriage 105 trips and closes the switch 420 energizing the solenoids 160 of the selective element 155 and setting the tabs 161 in a position to trip and set the dogs 55 of the car 26 which is to receive the load.

When the carriage 105 reaches the upper end of its path it trips and holds closed a switch 226, and as the car 26 reaches the center of the well, one of the cam bars thereon trips and closes a switch 227 thereby completing a circuit by which the motor 127 is started to lower the carriage and deliver the load thereon upon the flanged bars 35 of the car by the energizing of the relay 476. Such circuit comprises trunk lead 450, branch lead 455, lead 456, switch 210, lead 457, switch 213, leads 458, 459, 477, car tripped switch 227, lead 478, carriage tripped switch 226, leads 479, 480, 481, relay 476, lead 482, normally closed switch 230, leads 483, 465, 466, 467 and trunk lead 451. The closure of the down switch 475 starts the motor 127 and the carriage descends. The switches 227 and 226 which open as soon as the car passes on and the carriage starts its descent are by-passed by the following holding circuit which is completed through the closure of the switch 475 and comprises trunk lead 450, branch lead 455, lead 456, switch 210, lead 457, switch 213, leads 458, 468, 486, bar 487 on switch 475, leads 488, 481, relay 476, lead 482, switch 230, leads 483, 465, 466, 467 and trunk lead 451.

As the carriage descends it trips and closes the switch 430 of the selective device element 170, whereupon as shown in Fig. 20, the circuit of the solenoid 185 is completed, if the dial 401 is set for a single load, and energized to raise the latch 179 and return the arm 173 to its normal position opening the switch 189. The carriage 105 as it reaches the bottom of the well, trips and opens the switch 230 thus breaking the holding circuit through relay 476, and opening the down switch 475 to stop the motor 127.

The car 26 now advances with its load along its path of travel and since it is no longer empty the upper dog 55 set thereon, by which the switch 440 was tripped and closed, must be restored to its normal position. This is done by means of a tab, not shown, actuated by a solenoid 437, similar to the solenoids 160 of the selective device element 155. The solenoid 437 (see Fig. 20) is connected to the trunk lead 410 through the lead 438 and to the solenoid return lead 406 through lead 439. The closure of the switch 420 by the carriage as it ascends will therefore energize the solenoid 437 actuating the tab so that it will trip the latch 65 of the upper dog 55 and allow it to resume its normal position. The car 26 will thereafter pass through loading stations without tripping the switches 440 and continue undisturbed until it reaches the unloading station to which its load is destined.

Figure 22:
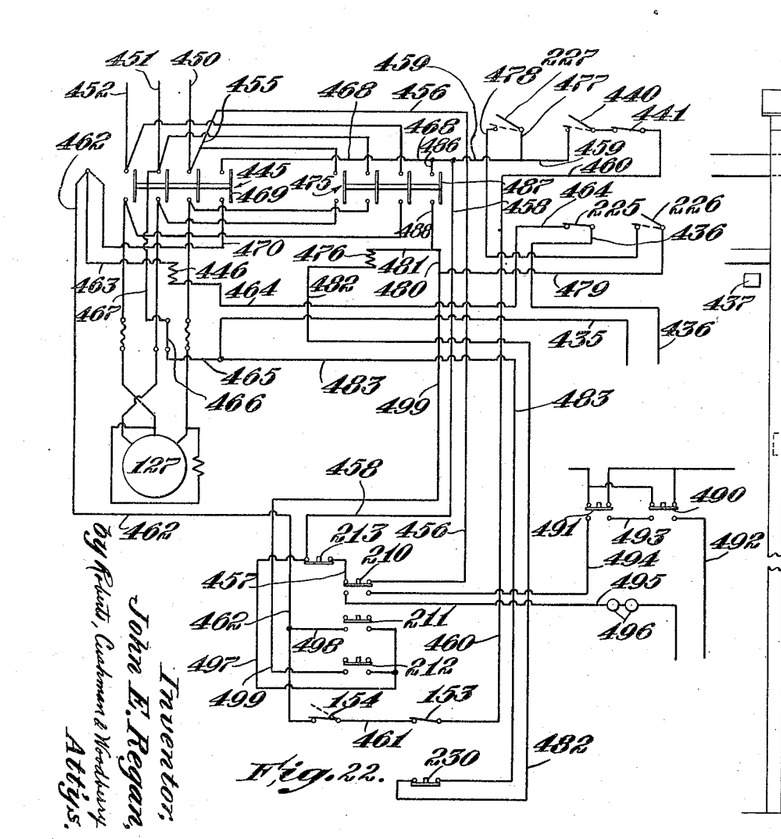
Fig. 22 is a wiring diagram of such details.

In order to prevent collision between the car 26 and an elevator carriage 105, there are provided in the motor drive circuit of the overhead conveyer 25 a pair of normally closed switches 490 and 491 mounted in parallel, as shown in Fig. 22. The switch 490 is tripped and opened by a cam bar on each car 26 as it approaches a loading station and the switch 491 is tripped and opened by the elevator carriage as it enters the path of travel of the car. Should both these switches be open at the same time, the motor drive circuit of the overhead conveyer would be broken and the conveyer would stop. The operator observing this can stop the motor 127 by actuating the switch 210 which, as pointed out above, is an essential element of each of the relay circuits. When all these switches 210, 490 and 491 have so shifted they complete a signal circuit comprising lead 492, switch 490, lead 493, switch 491, lead 494, switch 210 and lead 495 by which bulbs 496 are lighted.

The travel of the elevator carriage 105 has been heretofore described as dependent upon the arrival at its station of those cars 26 which close the normally open switches 440 and 227. Means, however, have been provided by which these switches are by-passed so that the operator can raise or lower the carriage independently of the conveyer 25 and regardless of the presence of a load thereon. If the carriage is to be raised, the operator sets the arms 173, 174 of the selective device element 170 in any off-normal position in order to close the switch 189 and closes the start switch 210 and up switch 211, thereby energizing the relay 446 by completing the following circuit; trunk lead 450, branch lead 455, lead 456, switch 210, lead 457, switch 213, lead 497, switch 211, leads 498, 462, 463, relay 446, lead 464, switch 225, lead 436, switch 189, leads 435, 465, 466, 467, trunk lead 451. The upward travel of the carriage thus started will continue until the switch 225 is tripped and opened by the carriage. If the carriage is to be lowered, the stop switch 210 and down switch 212 are closed to complete a circuit which energizes the relay 476 and which can be traced as follows: Trunk lead 450, branch lead 455, lead 456, switch 210, lead 457, switch 213, lead 497, switch 212, leads 499, 480, 481, relay 476, lead 482, switch 230, leads 483, 465, 466, 467, main line lead 451. This downward travel of the carriage will continue until the carriage trips and opens the switch 230.

The switch 441 is mounted on the conveyer frame below the pan 31 and its arm projects through the opening 32. Normally this switch is not tripped but in case a load should fall from the car to the pan and be pushed along it will trip and open the switch. This switch, being as pointed out above, an essential part of the circuit just described which is closed by the switch 440 will obviously act when tripped to prevent the completion of the circuit and thus collision between the elevator carriage and the dropped load. The operator would note this condition and stop the conveyer to remedy it.

The car 26 with its load thereon advances to the unloading station 300 at which the load is to be delivered. The upper dog 55 is in the inoperative position as well as all the other dogs of the selective device element 50, except the two tripped and set by the arms 161 (shown in the drawings as the third and fifth dogs below the upper dog). The elevator carriage 305 normally occupies the position shown in full lines in Fig. 23 with its load receiving platform slightly below the flanged bars 35 of the car 26 on which the load rests. Mounted in the well of the unloading station are a pair of normally open switches 500 and 501 spaced to trip the two dogs assigned to that station. It will be understood that the switches 500 and 501 of each unloading station are differently spaced so that both are tripped only by the dogs 55 on a car 26 having a load destined therefor. Each unloading station is also provided with solenoids 502 and 503 which are similar to the solenoids 160 previously described and which actuate tabs (not shown) to trip the latches of the dogs 55 set for that station and restore them to their normal inoperative position.

Figures 23, 24:
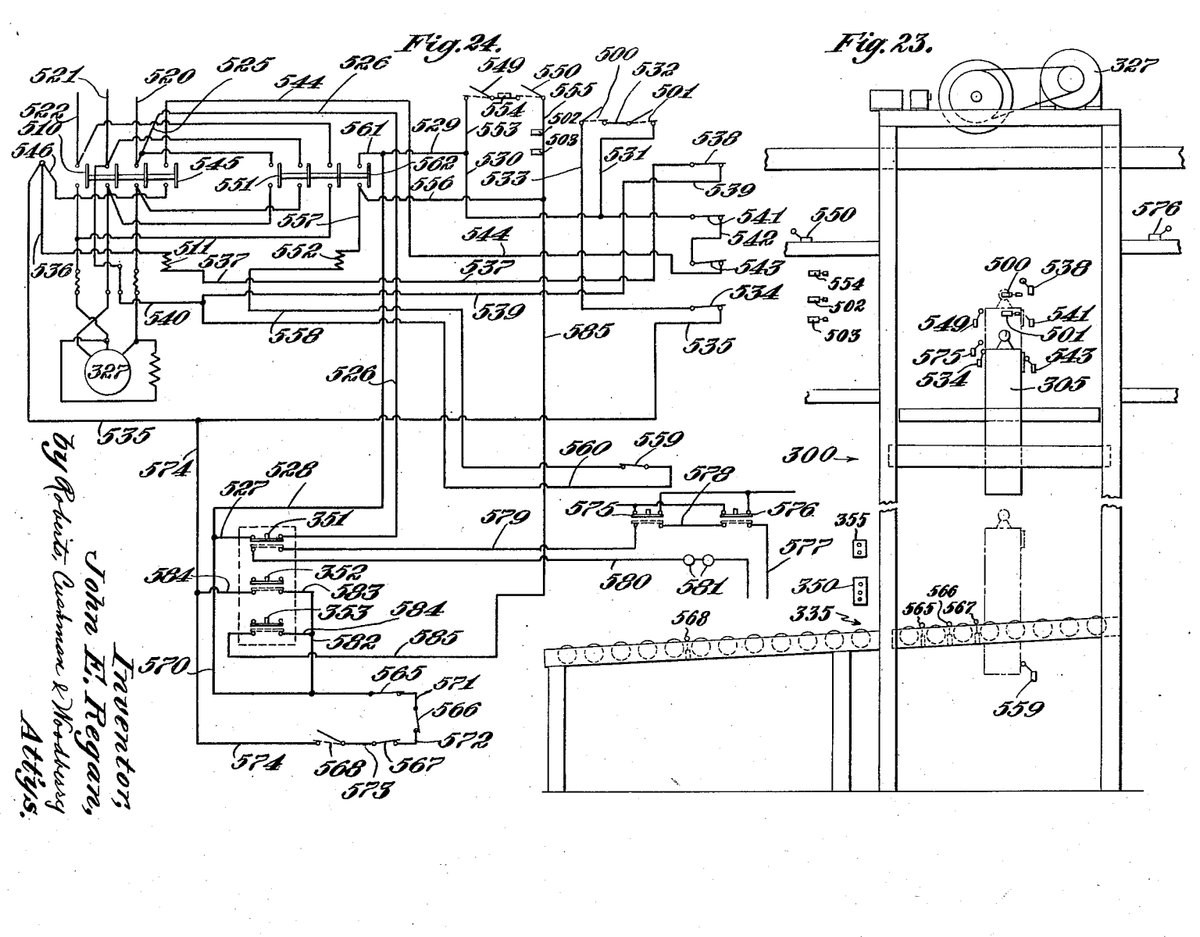
Fig. 23 is a schematic view illustrating the electrical details of each unloading station.
Fig. 24 is a wiring diagram of such details.

When both the switches 500 and 501 are tripped and closed, certain circuits are completed to energize the relay 511 of the magnetic starter whereby the up switch 510 is closed and the motor 327 caused to raise the carriage from its normal intermediate position to its upper position. The initial relay energizing circuit may be traced as follows: trunk lead 520, branch lead 525, lead 526, switch 351, leads 527, 528, 529, 530, 531, switch 501, lead 532, switch 500, lead 533, switch 534, leads 535, 536, relay 511, lead 537, normally closed switch 538, leads 539, 540, trunk lead 521. The switches 500 and 501 are only opened momentarily and in order to keep the switch 510 closed, a holding circuit is established to wit: trunk lead 520, branch lead 525, lead 526, switch 351, leads 527, 528, 529, 530, normally closed switch 541, lead 542, switch 543, lead 544, bar 545 on switch 510, leads 546, 536, relay 511, lead 537, switch 538, leads 539, 540, trunk lead 521.

The carriage 305 removes the load from the car and rises in the well until it trips the switch 541 breaking the relay circuit and stopping the motor 327. Should the switch 541 fail for any reason to open the carriage will continue to rise until it trips and opens the switch 538. The switch 549 is tripped and held closed by the carriage 305 in its upper position of rest. The carriage remains stationary until the car 26 has left the station and a cam bar thereon has tripped and closed the switch 550. Thereupon the down switch 551 of the motor line is thrown by the energizing of the relay 552 of the magnetic starter and the motor 327 lowers the carriage. The circuits by which the relay 552 is energized may be traced as follows: trunk lead 520, branch lead 525, lead 526, switch 351, leads 527, 528, 529, 553, switch 549, solenoid 554, switch 550, lead 555, energizing solenoids 502 and 503, leads 556, 557, relay 552, lead 558, normally closed switch 559, leads 560, 540, trunk lead 521. The switch 551 when closed completes a holding circuit by-passing the switches 549 and 550 which remain closed only so long as the carriage and cam bar respectively are in contact therewith, to wit: trunk lead 520, branch lead 525, lead 526, switch 351, leads 527, 528, 561, bar 562, lead 557, relay 552, lead 558, switch 559, leads 560, 540, trunk lead 521. When the carriage reaches the bottom of the well it trips and opens the switch 559 thus opening the circuit and stopping the motor 327.

The load on the carriage is deposited upon the platform 335 opening one or more of the normally closed switches 565, 566, 567. The load passes by gravity over the platform out of the well and after leaving the well trips and closes the switch 568 whereupon the relay 511 is again energized to throw the up switch 510 and cause the motor 327 to raise the carriage by completing the following circuit: trunk lead 520, branch lead 525, lead 526, switch 351, leads 527, 570, switch 565, lead 571, switch 566, lead 572, switch 567, lead 573, switch 568, leads 574, 535, 536, relay 511, lead 537, switch 538, leads 539, 540, trunk lead 521. The switch 568 which is closed only so long as it is tripped by a load is by-passed by a relay holding circuit completed by the throwing of the up switch 510, to wit: trunk lead 520, branch lead 525, lead 526, switch 351, leads 527, 528, 529, 530, switch 541, lead 542, switch 543, lead 544, bar 545, leads 546, 536, relay 511, lead 537, switch 538, leads 539, 540, trunk lead 521. When the carriage 305 arrives at its normal intermediate position, it trips and opens the switch 543 breaking the relay energizing circuit and stopping the carriage.

In order to prevent collision between a car 26 as it passes through an unloading station and the carriage 305 safety means similar to that employed at the loading station are provided. In the drive circuit for the overhead conveyer 25 are provided parallel normally closed switches 575 and 576. The switch 575 is tripped by the carriage when above its normal intermediate position and the switch 576 is tripped by a cam bar on each car 26 as it approaches the station. Should both switches 575 and 576 be tripped and open at the same time, the drive circuit is broken and the conveyor 25 stopped. When the switches 575 and 576 open the drive circuit they form parts of a signal circuit which is completed by shifting the switch 351, to open the station circuit. Such signal circuit may be traced as follows: lead 577, switch 576, lead 578, switch 575, lead 579, switch 351, lead 580, through signal bulbs 581.

The operator by closing up switch 352, or down switch 353 as well as start switch 351 may cause the motor 327 to raise or lower the carriage independent of the conveyer 25. When the switches 351 and 352 are closed, the relay 511 is energized to throw the up switch 510 and start motor 327 through the completion of the following circuit, trunk lead 520, branch 525, lead 526, switch 351, leads 527, 570, 582, 583, switch 352, leads 584, 574, 535, 536, relay 511, lead 537, switch 538, leads 539, 540, trunk lead 521. Unless the switches 351 or 352 is opened by the operator the carriage continues its travel until it trips and opens the switch 538. When the switches 351 and 353 are closed the relay 552 is energized to throw the down switch 551 and start the motor 327 through the completion of a circuit comprising trunk lead 520, branch lead 525, lead 526, switch 351, leads 527, 570, 582, 584, switch 353, leads 585, 556, 557, relay 552, lead 558, switch 559, leads 560, 540, trunk lead 521. The carriage continues its descent until it trips and opens switch 559.

Since the car 26 is now empty the upper dog 55 thereon must be set and the station designating dogs restored to normal. The upper dog is set by means of a solenoid 554 indicated diagrammatically on Figs. 23 and 24. The solenoid 554 is similar in construction and operation to the solenoid 160 previously described and when energized actuates a tab (not shown) which trips and sets the upper dog as the car passes. As shown on Fig. 24 and previously described, the solenoid 554 as well as the solenoids 502 and 503 are energized upon the completion of the initial down circuit by the tripping and closing of the switch 550. The car 26 with the upper dog 55 alone set, indicating that it is empty, now continues along its path of travel passing through the various loading and unloading stations undisturbed until called upon at a loading station to receive and transport another load.

I claim:

1. In a conveyer system including a load transporting car having mounted thereon a plurality of destination-indicating dogs adapted to be set into operative position, a loading station and a plurality of unloading stations, said loading station including a car loading carriage, means for actuating said carriage, a selective device independent of said carriage and means for causing said device to set certain of the dogs on said car to indicate the unloading station to which the load supplied to the car by the carriage is destined and for controlling the operation of said carriage actuating means, said carriage when so actuated controlling the operation of said means to cause the device to set dogs on the car.

2. In a conveyer system including a load transporting car having mounted thereon a plurality of destination-indicating dogs adapted to be set into operative position, a loading station, a plurality of unloading stations and means for advancing said car along a path of travel past said stations, said loading station including a well, a carriage in said well, means for reciprocating said carriage in the well toward and from the path of travel of the car to deliver loads thereto, a selective device independent of said carriage including tabs by which the dogs on said car are set to indicate the unloading station to which the load to be supplied to the car by the carriage is destined, means for actuating said device and for causing said reciprocating means to advance the carriage toward the path of travel of the car and means actuated by said carriage as it advances for controlling the device causing function of said means.

3. In a conveyer system including a load transporting car having mounted thereon a plurality of destination-indicating dogs adapted to be set into operative position, a loading station, a plurality of unloading stations and means for advancing said car along a path of travel past said stations, said loading station including a well, a carriage in said well, means for reciprocating said carriage in the well toward and from the path of travel of the car to deliver loads thereto, a selective device independent of said carriage including tabs by which the dogs on said car are set to indicate the unloading station to which the load to be supplied to the car by the carriage is destined, a second selective device by which the first device is actuated, said second device coacting with means tripped by the car to cause said reciprocating means to advance the carriage toward the path of travel of the car, and means actuated by the carriage as it advances for permitting said second device to actuate said first device.

4. In a conveyer system including a load transporting car having mounted thereon a plurality of destination-indicating dogs adapted to be set into operative position, a loading station, a plurality of unloading stations and means for advancing said car along a path of travel past said stations, said loading station including a well, a carriage in said well, means for reciprocating said carriage in the well toward and from the path of travel of the car to deliver loads thereto, a selective device independent of said carriage including tabs by which the dogs on said car are set to indicate the unloading station to which the load to be supplied to the car by the carriage is destined, and solenoids by which said tabs are actuated, a second selective device including arms positioned by the operator, posts contacted by said arms to complete in part circuits to the desired solenoids, and a switch tripped by the carriage in its reciprocation toward the path of travel of the car to complete said circuits and energize said solenoids.

5. In a conveyer system including a load transporting car having mounted thereon a plurality of destination-indicating dogs adapted to be set into operative position, a loading station, a plurality of unloading stations and means for advancing said car along a path of travel past said stations, said loading station including a well, a carriage in said well, means for reciprocating said carriage in the well toward and from the path of travel of the car to deliver loads thereto, a selective device independent of said carriage including tabs by which the dogs on said car are set to indicate the unloading station to which the load to be supplied to the car by the carriage is destined, and solenoids by which said tabs are actuated, a second selective device including arms positioned by the operator, posts contacted by said arms to complete in part circuits through the desired solenoids, a switch closed by one of said arms when moved by the operator out of its normal inoperative position, and a switch tripped by the carriage in its movement toward the path of travel of the car to complete said circuits and energize said solenoids, and means tripped by the car as it approaches the loading station which cooperate with the switch to actuate said cariage reciprocating means to advance the carriage toward the path of travel of the car.

6. In a conveyer system including a load transporting car having mounted thereon a plurality of destination-indicating dogs adapted to be set into operative position, a loading station, a plurality of unloading stations and means for advancing said car along a path of travel past said stations, said loading station including a well, a carriage in said well, means for reciprocating said carriage in the well toward and from the path of travel of the car to deliver loads thereto, a selective device independent of said carriage including tabs by which the dogs on said car are set to indicate the unloading station to which the load to be supplied to the car by the carriage is destined, and solenoids by which said tabs are actuated, a second selective device including arms positioned by the operator, posts contacted by said arms to complete in part circuits through the desired solenoids, a switch closed by one of said arms when moved by the operator out of its normal inoperative position, a switch tripped by the carriage in its movement toward the path of travel of the car to complete said circuits and energize said solenoids and a switch tripped by the carriage in its movement away from the path of travel of the car to cause the return of said switch closing arm and permit the opening of the switch closed thereby.

7. In a conveyer system including a load transporting car having mounted thereon a plurality of destination-indicating dogs adapted to be set into operative position, a loading station, a plurality of unloading stations and means for advancing said car along a path of travel past said stations, said loading station including a well, a carriage in said well, means for reciprocating said carriage in the well toward and from the path of travel of the car to deliver loads thereto, a selective device independent of said carriage including tabs by which the dogs on said car are set to indicate the unloading station to which the load to be supplied to the car by the carriage is destined, and solenoids by which said tabs are actuated, a second selective device including arms positioned by the operator, posts contacted by said arms to complete in part circuits through the desired solenoids, a switch closed by one of said arms when moved by the operator out of its normal inoperative position, a switch tripped by the carriage in its movement toward the path of travel of the car to complete said circuits and energize said solenoids and a switch tripped by the carriage in its movement away from the path of travel of the car to cause the return of said switch closing arm and permit the opening of the switch closed thereby, and means actuated by the car as it approaches the loading station which cooperates with the switch closed by the arm to cause said carriage reciprocating means to advance the carriage toward the path of travel of the car.

8. In a conveyer system including a load transporting car having mounted thereon a plurality of destination-indicating dogs adapted to be set into operative position, a loading station, a plurality of unloading stations and means for advancing said car along a path of travel past said stations, said loading station including a well, a carriage in said well, means for reciprocating said carriage in the well toward and from the path of travel of the car to deliver loads thereto, a selective device independent of said carriage including tabs by which the dogs on said car are set to indicate the unloading station to which the load to be supplied to the car by the carriage is destined, and solenoids by which said tabs are actuated, a second selective device including arms positioned by the operator, posts contacted by said arms to complete in part circuits through the desired solenoids, a switch closed by one of said arms when moved by the operator out of its normal inoperative position, a switch tripped by the carriage in its movement toward the path of travel of the car to complete said circuits and energize said solenoids and a switch tripped by the carriage in its movement away from the path of travel of the car to cause the return of said switch closing arm and permit the opening of the switch closed thereby, means actuated by the car as it approaches the loading station which cooperate with the switch closed by the arm to cause said carriage reciprocating means to advance the carriage toward the path of travel of the car and means actuated by the car as it leaves the loading station to cause said carriage reciprocating means to move the carriage away from such path of travel.

9. In a conveyer system including a load transporting car having mounted thereon a plurality of destination-indicating dogs adapted to be set into operative position, a loading station, a plurality of unloading stations and means for advancing said car along a path of travel past said stations, said loading station including a well, a carriage in said well, means for reciprocating said carriage in the well toward and from the path of travel of the car to deliver loads thereto, a selective device independent of said carriage including tabs by which the dogs on said car are set to indicate the unloading station to which the load to be supplied to the car by the carriage is destined, and solenoids by which said tabs are actuated, a second selective device including arms positioned by the operator, means for holding the arms in such positions, posts contacted by said arms to complete in part circuits through the desired solenoids, a switch closed by one of said arms when moved by the operator out of its normal inoperative position, means resisting such movement of the switch closing arm, a solenoid which when energized renders the arm holding means inoperative and permits the movement resisting means to restore the arm to its normal inoperative position and permit the switch closed thereby to open, a switch closed by the carriage upon its upward movement to complete the circuits to and energize the selected solenoid of the first device and a switch closed by the carriage upon its downward movement to complete a circuit to and energize the solenoid of the second device.

10. In a conveyer system including a plurality of load transporting cars each having mounted thereon a plurality of destination-indicating dogs and a dog which indicates the status of the car, said destination-indicating dogs being at a normal inoperative position when the car is empty and being adapted to be set independently into operative position and said status dog being in one position when the car is empty and in a different position when the car is filled, a loading station and a plurality of unloading stations, means at said loading station for setting certain of the destination-indicating dogs upon an empty car and for changing the position of the status indicating dog and means at each unloading station for restoring to normal position the set dogs of the car carrying a load destined thereto and for resetting the status indicating dog thereon.

11. In a conveyer system including a plurality of load transporting cars each having mounted thereon a plurality of destination-indicating dogs and a dog which indicates the status of the car, said destination-indicating dogs being at a normal inoperative position when the car is empty and being adapted to be set independently into operative position and said status dog being in one position when the car is empty and in a different position when the car is filled, a loading station and a plurality of unloading stations, the loading station including an elevator carriage by which loads are delivered to the car, means for operating the carriage, means for setting certain of the destination-indicating dogs upon an empty car about to receive a load, means engaged by the status dog of such car for actuating said carriage operating means, and means for thereafter changing the position of the status dog of such car and each unloading station including an elevator carriage by which loads are removed from the cars, means for operating said carriage, means engaged by the set destination-indicating dogs of a car carrying a load destined to this station for actuating said carriage operating means and means for changing the position of the status dog of such car, and for restoring the set destination-indicating dogs thereon to normal.

12. In a conveyer system including a plurality of load transporting cars, a loading station and a plurality of unloading stations, each unloading station comprising a vertical well, an elevator carriage adapted to reciprocate in said well, means for actuating said carriage, said carriage normally taking a position intermediate the ends of the well, means actuated by a car transporting a load destined for that station for causing said carriage actuating means to raise the carriage to the top of the well and remove the load from the car and means actuated by said car for causing said carriage actuating means to lower the carriage to the bottom of the well.

13. In a conveyer system including a plurality of load transporting cars, a loading station and a plurality of unloading stations, each unloading station comprising a vertical well, an elevator carriage adapted to reciprocate in said well, means for actuating said carriage, said carriage normally taking a position intermediate the ends of the well, means actuated by a car transporting a load destined for that station for causing said carriage actuating means to raise the carriage to the top of the well and remove the load from the car, means actuated by said car for causing said carriage actuating means to lower the carriage with the load thereon to the bottom of the well, a platform to which such load is delivered, and means actuated by the load upon leaving the well for causing said carriage actuating means to raise the carriage to its normal intermediate position.

14. In a conveyer system including a load transporting car, a loading station and an unloading station, a movable status dog on said car which indicates in one position that the car is empty and in another position that the car is loaded, said loading station including a car loading carriage, means for raising said carriage to supply a load to said car when empty, means actuated by the status dog in the position indicating that the car is empty, said last-named means permitting the operation of the first-named means, a normally inoperative trip at said loading station which is rendered operative by the first-named means to engage and move the dog into the position indicating that the car is loaded, and a trip at the unloading station which moves the dog into the position indicating that the car is empty.

15. In a conveyer system including a load transporting car, a loading station and an unloading station, a movable status dog on said car which indicates in one position that the car is empty and in another position that the car is loaded, said loading station including a car loading carriage, means for raising said carriage to supply a load to said car when empty, means actuated by the status dog in the position indicating that the car is empty, said last-named means permitting the operation of the first-named means, a normally inoperative movable trip at said loading station which is moved by the load supplying means into operative position whereat it moves the dog on the car into the position indicating that the car is loaded and a trip at the unloading station which moves the dog into the position indicating that the car is empty.

16. In a conveyer system including a plurality of load transporting cars, and an unloading station, each said car including load supporting means on which the ends of the load rest, said unloading station comprising a vertical well, an elevator carriage adapted to reciprocate in said well, means for actuating said carriage, said carriage normally taking a position intermediate the ends of the well, and means actuated by a car transporting a load destined for that station for causing said carriage actuating means to raise the carriage in the well until it engages the load and lifts it from the supporting means, to hold the carriage and load at the top of the well until the car has passed the station and then to lower the carriage and load to the bottom of the well.

17. In a conveyer system including a plurality of load transporting cars, and an unloading station, each said car including load supporting means on which the ends of the load rest, said unloading station comprising a vertical well, an elevator carriage adapted to reciprocate in said well, said carriage normally taking a position intermediate the ends of the well, and means for raising said carriage in the well until it engages the load and lifts it from the supporting means to hold the carriage and load at the top of the well until the car has passed the station and then to lower the carriage and load to the bottom of the well.

JOHN E. REGAN.